US012392875B2

(12) United States Patent
Neidhardt et al.

(10) Patent No.: US 12,392,875 B2
(45) Date of Patent: Aug. 19, 2025

(54) LIDAR TARGET SIMULATOR, LIDAR TESTING SYSTEM AS WELL AS METHOD OF TESTING A LIDAR DEVICE

(71) Applicant: Rohde & Schwarz GmbH & Co. KG, Munich (DE)

(72) Inventors: Steffen Neidhardt, Munich (DE); Matthias Beer, Munich (DE); Maximilian Bogner, Munich (DE); Benedikt Simper, Munich (DE); Gerhard Hamberger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1083 days.

(21) Appl. No.: 17/366,756

(22) Filed: Jul. 2, 2021

(65) Prior Publication Data

US 2022/0003852 A1 Jan. 6, 2022

(30) Foreign Application Priority Data

Jul. 6, 2020 (EP) ..................................... 20184311

(51) Int. Cl.
*G01S 7/497* (2006.01)
*G01S 17/931* (2020.01)

(52) U.S. Cl.
CPC ............. *G01S 7/497* (2013.01); *G01S 17/931* (2020.01)

(58) Field of Classification Search
CPC ............................... G01S 7/497; G01S 17/931
USPC ........................................................ 345/426
See application file for complete search history.

(56) References Cited

U.S. PATENT DOCUMENTS

| 8,368,876 | B1 * | 2/2013 | Johnson | G01S 17/89 356/3.01 |
| 9,110,154 | B1 * | 8/2015 | Bates | G01S 17/08 |
| 2019/0011558 | A1 * | 1/2019 | Crouch | G08G 1/16 |
| 2021/0357552 | A1 * | 11/2021 | daSilva | G01S 7/497 |

(Continued)

FOREIGN PATENT DOCUMENTS

| CN | 101131430 A | 2/2008 |
| CN | 109031250 | * 6/2018 ............ G01S 7/494 |
| CN | 109031250 A | 12/2018 |

(Continued)

*Primary Examiner* — Jin Ge
(74) *Attorney, Agent, or Firm* — CHRISTENSEN O'CONNOR JOHNSON KINDNESS PLLC

(57) ABSTRACT

A LIDAR target simulator for testing a LIDAR device is described. The LIDAR target simulator includes a screen, a light impinging determination module, a control and/or analysis circuit and a response generation module. The light impinging determination module is configured to determine the location of impinging light on the screen and to forward information concerning the location determined to the control and/or analysis circuit. The control and/or analysis circuit is configured to process the information concerning the location determined by the light impinging determination module and to determine a response based on a target scenario applied. The control and/or analysis circuit is further configured to control the response generation module in accordance with the response determined. The response generation module is configured to generate a diffuse response signal to be received by the LIDAR device. Further, a LIDAR testing system and a method of testing a LIDAR device are described.

18 Claims, 3 Drawing Sheets

(56) References Cited

U.S. PATENT DOCUMENTS

2021/0373137 A1\* 12/2021 Tan ..................... G02B 26/023

FOREIGN PATENT DOCUMENTS

| DE | 102007057372 | A1 | 5/2009 | | |
|----|--------------|----|--------|---|---|
| DE | 102019106129 |    | \* 11/2018 | ............. | G01S 7/497 |
| DE | 102019106129 | A1 | 5/2020 | | |
| EP | 0601872 | B1 | 2/1997 | | |
| EP | 2955543 | A1 | 12/2015 | | |

\* cited by examiner

LIDAR TARGET SIMULATOR, LIDAR TESTING SYSTEM AS WELL AS METHOD OF TESTING A LIDAR DEVICE

TECHNICAL FIELD

Embodiments of the present disclosure relate to a LIDAR (light detection and ranging) target simulator for testing a LIDAR device. Further, embodiments of the present disclosure relate to a LIDAR testing system as well as a method of testing a LIDAR device by a LIDAR target simulator.

BACKGROUND

LIDAR (light detection and ranging) devices such as LIDAR sensors become more and more popular in different applications, particularly in the automotive sector due to autonomous driving, also called self-driving vehicles. Since the LIDAR devices become more and more popular in different technical fields, it is also necessary to validate and compare the different LIDAR devices concerning their respective characteristics. For a vehicle-in-the-loop test of a self-driving vehicle equipped with at least one LIDAR device, a LIDAR target simulator is necessary in order to validate the respective LIDAR device used.

Typically, a target simulator is used to test the LIDAR device while applying a certain target scenario for validating the LIDAR device. Depending on the target scenario applied, at least one target is simulated according to the respective target scenario applied.

In general, the respective target simulator receives a signal transmitted by the LIDAR device and responds with a delayed signal that corresponds to a target or rather obstacle according to the target scenario applied. The delay in time represents the distance of the target simulated.

In the state of the art, the LIDAR target simulators use several detectors configured to detect the light of the LIDAR device and several transmitters configured to transmit the delayed signal. The several detectors and the several transmitters are necessary to test a scanning LIDAR device that in real operation transmits light in a certain direction while waiting for a reflected signal from this direction. The LIDAR target simulator simulates the reflected signal by emitting the response signal having the delay in time.

Since the LIDAR device scans the entire volume in front of the LIDAR device, the LIDAR test simulator needs the several detectors and the several transmitters for evaluating the characteristics of the LIDAR device appropriately.

However, the costs for such a test system as well as the costs related to the testing scenario are very high due to the large number of components required for testing the LIDAR device, namely the several detectors and the several transmitters.

SUMMARY

Accordingly, there is a need for a more cost-efficient way to validate a LIDAR device in an appropriate manner.

Embodiments of the present disclosure provide a LIDAR (light detection and ranging) target simulator for testing a LIDAR device. In an embodiment, the LIDAR target simulator comprises a screen, a light impinging determination module, a control and/or analysis circuit or module that is connected with the light impinging determination module in a signal transmitting manner, and a response generation module that is connected with the control and/or analysis module in a signal transmitting manner. The light impinging determination module is configured to determine the location of impinging light on the screen and to forward information concerning the location determined to the control and/or analysis module. The control and/or analysis module is configured to process the information concerning the location determined by the light impinging determination module and to determine a response based on a target scenario applied. The control and/or analysis module is further configured to control the response generation module in accordance with the response determined. The response generation module is configured to generate a diffuse response signal to be received by the LIDAR device.

Further, embodiments of the present disclosure provide to a method of testing a LIDAR device by a LIDAR target simulator. In an embodiment, the method comprises the steps of:
  determining a location of impinging light from the LIDAR device on a screen by a light impinging determination module of the LIDAR target simulator;
  forwarding information concerning the location to a control and/or analysis circuit or module of the LIDAR target simulator;
  processing the information concerning the location of the impinging light on the screen by the control and/or analysis module;
  determining a response based on a target scenario applied by the control and/or analysis module;
  controlling a response generation module of the LIDAR target simulator in accordance with the response determined by the control and/or analysis module; and
  generating a diffuse response signal by the response generation module.

The main idea is that light emitted by the LIDAR device to be tested can be detected by the light impinging determination module that provides information concerning the location of the impinging light on the screen, which in turn relates to a field of view of the LIDAR device to be tested. The control and/or analysis module receives the information concerning the location of the impinging light from the light impinging determination module, wherein the respective information gathered is processed by the control and/or analysis module appropriately in order to calculate a certain response for the LIDAR device under test. The response is assigned to a certain target/obstacle in the target scenario applied for testing the LIDAR device. In some embodiments, the target simulated depends on the location of the impinging light on the screen, for example a front side of the screen, since the location defines the field of view (FOV) of the LIDAR device as mentioned above. The LIDAR target simulator calculates, based on the (indirectly) determined field of view of the LIDAR device, if and/or at which distance the light emitted by the LIDAR device impinges on a respective target in the target scenario. Hence, it is calculated at which distance the light emitted by the LIDAR device would be reflected by the target/obstacle in the environment simulated.

In other words, the location of the impinging light on the screen provides the respective information with respect to the field of view of the LIDAR device. The control and/or analysis module is enabled to derive a respective obstacle or rather target in the field of view of the LIDAR device which depends on the target scenario applied for testing the LIDAR device since the target scenario defines the environment of the LIDAR device in which the LIDAR device shall be tested.

In addition to the location of the impinging light on the screen, information concerning the impinging time may also be gathered, for instance by the light impinging determination module. In some embodiments, at least a time stamp may be provided once it is detected that the light impinges on the screen. Furthermore, a pulse form of an incoming light pulse, for example laser pulse, can be sampled simultaneously. This way, the same pulse form or pulse pattern can be replayed to the LIDAR device later.

Then, the control and/or analysis module determines a respective response according to the target scenario applied, wherein the control and/or analysis module controls the response generation module accordingly such that a return signal (response signal) is generated and forwarded to the LIDAR device under test. The response or rather return signal simulates a reflected signal of an obstacle/target in the field of view of the LIDAR device such that the LIDAR device detects the respective response signal (return signal).

However, the LIDAR device only checks a certain area that is associated with the light emitting direction of the LIDAR device, namely the field of view, in order to receive a response signal. The LIDAR device typically emits light in a light emitting direction that is associated with the location of the impinging light on the screen, for example the front side of the screen. Put differently, the field of view is associated with the light emitting direction or rather the location of the impinging light on the screen.

In order to ensure that the LIDAR device receives the response signal provided by the response generation module irrespective of the field of view of the LIDAR device, the response signal is a diffuse one such that it is always ensured that the LIDAR device receives the response signal, namely irrespective of the specific field of view of the LIDAR device. In other words, the diffuse response signal ensures that it is not necessary to provide several different transmitters that can be controlled individually for providing a response signal. Hence, the entire hardware costs of the LIDAR target simulator can be reduced significantly. Since the costs for the hardware of the LIDAR target simulator is reduced, the costs for testing the LIDAR device are also reduced.

Generally, it is ensured that the received response signal is not attenuated by spatial filtering. The LIDAR device receives the response signal in any case without any attenuation due to spatial filtering.

The response generation module may transmit the response signal towards the screen such that the response signal impinges on the screen in order to be diffused, thereby providing the diffuse response signal that is generated by the response generation module.

In case of diffusing the response signal by the screen, alternative embodiments may be provided.

In a first embodiment, the diffuse response signal generated is directed towards the rear side of the screen such that the diffuse response signal illuminates the entire area on the rear side of the screen, thereby providing the diffuse response signal to be received by the LIDAR device that scans the screen, for example the front side of the screen which is opposite to the rear side of the screen.

In a second embodiment, the diffuse response signal generated is directed towards the front side of the screen such that the diffuse response signal illuminates the entire area on the front side of the screen, thereby providing the diffuse response signal to be received by the LIDAR device that scans the screen, for example the front side of the screen.

In a third embodiment, the diffuse response signal generated is directed towards another screen, for example a second screen separately formed to the first screen scanned by the light impinging determination module. The diffuse response signal illuminates the entire area of the second screen, thereby providing the diffuse response signal to be received by the LIDAR device that scans the second screen.

In other words, the response generation module ensures that an illumination of the entire screen takes place such that the LIDAR device under test receives a response signal in any case, namely irrespective of the field of view (FOV) of the LIDAR device.

Alternatively, the response generation module may generate the diffuse response signal that is directly forwarded to the LIDAR device to be tested, namely without impinging on a screen. Accordingly, the diffuse response signal generated is directed towards the LIDAR device directly. The diffuse response signal is transmitted such that the LIDAR device receives or rather senses the diffuse response signal in any case, for example irrespective of the current field of view (FOV).

The LIDAR target simulator can be used for every scanning LIDAR device without any significant adaptions to the LIDAR target simulator. A scanning LIDAR device may comprise, for example, a Microelectromechanical System (MEMS), a rotating mirror and/or a prism. Moreover, the scanning LIDAR device may comprise, for example, electronic beam steering means that is used to steer the light beam in an electronic manner.

The LIDAR target simulator allows an infinite number of pixels to be generated (simultaneously), making the LIDAR target simulator a valid target simulator for simulating a complex scene at comparable low costs. In some embodiments, every scanning LIDAR device can be used for testing purposes.

The LIDAR target simulator may generate only one target at a time. However, the LIDAR device to be tested acquires its scanning volume sequentially. Accordingly, several targets can be generated by the LIDAR target simulator, for example in a subsequent manner.

However, the LIDAR target simulator may also generate several targets simultaneously, for example by using several response areas.

In addition, the testing is simplified since the LIDAR device does not have to be aligned with the LIDAR target simulator prior to the testing due to the diffuse response signal generated such that the overall testing time can be reduced significantly, yielding reduced costs.

In general, the LIDAR target simulator can be used for testing a scanning LIDAR device such as a scanning LIDAR device, for example a scanning LIDAR sensor. A scanning LIDAR device typically scans a space in front of the LIDAR device using one or multiple light beams, for example laser beams. The light beams of the LIDAR device are steered electronically and/or mechanically in order to scan the space in front of the LIDAR device.

Further, it is known that a distance to an obstacle or rather target is measured by transmitting a collimated light pulse, for example a collimated laser pulse. The pulse is reflected by the environment, namely an obstacle or rather target, wherein the reflected pulse is received by a light receiving unit of the LIDAR device. From the respective time difference between the transmitted pulse and the received pulse, the distance between the LIDAR device and the obstacle/target can be calculated.

Since the direction where the light pulse is transmitted to is known, the LIDAR device is generally enabled to create a point cloud of its environment by scanning the entire space in front of the LIDAR device (in a pointwise manner).

The LIDAR target simulator is used to simulate the environment by receiving the light (beam) transmitted from the LIDAR device, for example the light emitting unit, and to calculate a response according to the target scenario applied. The LIDAR target simulator also generates a response signal transmitted to the LIDAR device which shall simulate a reflected signal from a respective obstacle/target in the environment of the LIDAR device.

The respective LIDAR device can be evaluated appropriately while applying a certain test scenario that is used for different LIDAR devices such that these LIDAR devices tested under the same conditions can be compared with each other since comparable results are obtained, ensuring an appropriate comparison of the different LIDAR devices.

Generally, the LIDAR device may measure the distance to the obstacle/target by "time-of-flight" (delay in time) or FMCW (Frequency-Modulated Continuous Waves) techniques for determining the distance to the respective obstacle/target. An outgoing light beam of a FMCW LIDAR device is chirped repeatedly in frequency. Hence, the FMCW LIDAR device determines the distance to the obstacle/target by repeatedly linearly chirping the frequency of the light beam and measuring a difference frequency, providing the information how much the frequency changed while the light received made its trip to the obstacle/target.

Hence, the response generation module may also be configured to generate a FMCW response signal.

In case of a FMCW LIDAR device to be tested, the control and/or analysis module determines a response and controls the response generation module such that the response signal has a dedicated frequency, corresponding to the distance to the respective obstacle/target simulated.

In some embodiments, the information concerning the location of the impinging light on the screen is processed by the control and/or analysis module based on the location in the scenario mapped from the location of the impinging light. In other words, the control and/or analysis module takes the (target) scenario into account when processing the information concerning the location of the impinging light on the screen while determining the response accordingly.

In general, the diffuse response signal is intentionally diffused. Hence, the diffuse response signal is different from a widened signal emitted that (naturally) widens due to travelling effects.

An aspect of the disclosure provides that the response generation module comprises a laser, a diffusor located downstream of the laser and/or an attenuator for attenuating the response signal, wherein the attenuator is located between the diffusor and the laser.

The laser ensures that a laser pulse can be transmitted that is used as the response signal. Thus, the LIDAR device under test receives a signal that corresponds to the signal transmitted by itself. Accordingly, a real world scenario of the LIDAR device can be simulated appropriately.

The diffusor ensures that the laser beam is diffused appropriately, thereby providing the diffuse response signal that illuminates the entire area of the rear side of the screen. Hence, it is ensured that the LIDAR device receives the response signal irrespective of its field of view.

The attenuator interposed between the laser and the diffusor may attenuate the response signal depending on the respective target scenario or rather the target simulated. Hence, the intensity of the response signal (light beam of the laser) can be attenuated or rather reduced.

The laser of the response generation module may be controlled such that the response signal generated can be modulated in intensity to avoid an overload of the LIDAR device.

In addition, the laser together with the diffusor may create an even illumination of the screen or rather a light receiving unit of the LIDAR device.

In a certain embodiment, the laser may face the rear side of the screen, wherein the diffusor is located between the rear side of the screen and the laser.

Another aspect of the disclosure provides that the control and/or analysis module is configured to determine a correct delay time for the response or brightness associated with the location of the impinging light determined by the light impinging determination module. The delay time or brightness may depend on the target scenario applied. The delay time corresponds to the distance of the target/obstacle simulated in the respective target scenario applied which depends on the field of view of the LIDAR device that can be derived from the location of the impinging light on the screen. The control and/or analysis module is enabled to calculate the respective distance to the obstacle/target simulated in the field of view of the LIDAR device due to the target scenario applied. From the respective distance calculated, the corresponding delay time for the response signal can be derived. The response signal is delayed accordingly such that the distance of the simulated target/obstacle is ensured.

The light impinging determination module may comprise at least one position sensitive detector, at least one detector array and/or at least one angle of arrival sensor. The detector array may relate to a two-dimensional detector array such that a certain plane is provided that can be used for determining the location of the impinging light. The angle of arrival sensor detects the impinging angle of the light emitted by the LIDAR device. For this purpose, the angle of arrival sensor may comprise several (optical) sensors, for instance three orthogonal sensors which allow to determine the angle of arrival of the light emitted by the LIDAR device. The aperture angle allows a magnitude-based estimation of the angle of arrival.

The position sensitive detector (PSD), also called position sensitive device, corresponds to an optical position sensor that can measure a position of a light spot in one or two dimensions on a (sensor) surface. The respective components can be used for determining the location of the light beam impinging on the (front side of the) screen.

The position sensitive detector (PSD) may detect the location of the light beam with an infinite resolution.

Generally, the light impinging determination module may also comprise a sensor that determines the field of view of the LIDAR device. Hence, the location of the impinging light on the front side of the screen is derived from the sensed field of view of the LIDAR device, namely the orientation of the light emitting unit and/or the light receiving unit of the LIDAR device. The respective information is forwarded to the control and/or analysis module for processing purposes.

For instance, the screen is at least partially transparent for the light used for testing. Light emitted by the LIDAR device impinges on a first side of the screen, for instance the front side of the screen, whereas the at least partially transparent screen ensures that the light can also be sensed on the opposite side of the screen, for instance the rear side of the screen, to which the light impinging determination module is assigned. In other words, the light impinging determination module can determine the respective location of the impinging light on the first side of the screen even though the light impinging determination module is facing the second side of the screen being opposite. This can be achieved due to the fact that the screen is partially transparent. For instance, the screen is semi-transparent.

The screen may be established by a milky plastic sheet or a sheet of paper since they are partially transparent. However, the screen may also be established by a mirror, for example a partially transparent mirror.

The control and/or analysis module may be configured, for example, to determine a response that varies over time based on the target scenario applied and/or wherein the response generation module may be configured to generate a diffuse response signal that varies over time based on the target scenario applied. The location determination module allows to provide a wide response that varies, thereby providing a complex scenario in response to the LIDAR device. Accordingly, the LIDAR device can be tested with respect to complex scenarios.

According to another aspect of the disclosure, the light impinging determination module comprises an optical element assigned to the screen. Generally, the light impinging determination module is facing a respective side, for instance the rear side, of the screen. The optical element is used to focus the light (showing through the screen) on the detector (array) and/or the angle of arrival sensor. Hence, the location of the light beam emitted by the LIDAR device can be determined more accurately. The optical element may be provided depending on the type of sensor/detector (array) used by the light impinging determination module.

The response generation module may be configured, for example, to generate more than one response signal to be received by the LIDAR device, for example wherein the response generation module comprises more than one laser and/or more than one diffusor. The several response signals may be emitted in a subsequent manner or in a simultaneous manner provided that more than one laser and/or diffusor are/is provided. For instance, two diffusors may be located with respect to a single laser such that two different diffuse response signals are generated that can be received by the LIDAR device.

In some embodiments, the response generation module is configured to transmit at least two different diffuse response signals to different response areas, the different diffuse response signals are to be received by different light receiving units of the LIDAR device. Generally, several light receiving units of the LIDAR device, namely at least two different light receiving units, can be tested simultaneously. Each of the several light receiving units receive a respective diffuse response signal provided by the response generation module irrespective of the field of view of the light receiving units due to the fact that the response signals are diffuse ones.

Generally, the at least two different diffuse response signals may be provided by a single laser, for example a single laser diode, that responds to all the different scanning lasers of the LIDAR device.

Moreover, the at least two different diffuse response signals may be transmitted to either the whole screen, for example wherein the at least two different diffuse response signals can be differentiated by a respective pulse pattern because of channel coding. Alternatively, the at least two different diffuse response signals may be transmitted to only a portion of the screen. However, since the at least two different diffuse response signals are channel coded, the LIDAR device will disregard the response signals coded for a different channel.

Accordingly, it is not necessary that the response generation module has multiple transmitters, for instance laser. In some embodiments, a channel coding may be applied such that the respective responses are forwarded to the entire screen by using a single transmitter, for instance a single laser (diode).

In general, the response generation module may also be configured to transmit at least two different diffuse response signals (to a single screen), wherein the different diffuse response signals are to be received by different light receiving units of the LIDAR device.

Furthermore, an additional light source may be provided that is connected with the control and/or analysis module, wherein the control and/or analysis module is configured to control the additional light source. The additional light source is configured to provide noise in order to test the LIDAR device under real conditions. The additional light source is associated with the screen such that the response signal to be detected on the screen by the LIDAR device is disturbed due to the light of the additional light source provided that the additional light source is activated. The light is outputted by the additional light source into the direction of the LIDAR device to be tested such that a light receiving unit of the LIDAR device is disturbed, but the LIDAR target simulator is not disturbed by the additional light. Put differently, a high noise level for the LIDAR target simulator can be avoided since the screen is not illuminated by the additional light source.

Since the control and/or analysis module is configured to control the additional light source, the additional light source is only activated in a certain target scenario.

For instance, the additional light source can be a daylight lamp that is configured to emit daylight. The daylight corresponds to the light emitted by the sun, namely sunlight. Thus, scenarios can be tested while the LIDAR device also receives a certain amount of daylight that may disturb the response signal received. In some embodiments, the LIDAR device can be tested under real conditions accordingly.

Moreover, a light detection module is provided that is orientated towards the screen, wherein the light detection module is configured to measure the spot size of a light beam on the screen. The light beam on the screen to be measured originates from the LIDAR device such that the light emitted by the LIDAR device is measured, namely its spot size. In some embodiments, the light beam corresponds to a laser beam that is issued by the LIDAR device to be tested.

The light detection module may be configured, for example, to determine the collimation of the light beam. This information can be used by the control and/or analysis module or the light impinging determination module when determining the location of the impinging light.

For instance, the light detection module may comprise a camera that is connected with the control and/or analysis module in a signal transmitting manner, wherein the camera is configured to detect the spot of the light beam on the screen. The camera forwards a representative signal to the control and/or analysis module, wherein the control and/or analysis module evaluates the representative signal in order to determine the spot size. From the spot size determined the control and/or analysis module is enabled to derive at the respective collimation of the light beam transmitted by the LIDAR device.

A factory mode (of the LIDAR device) may be provided in which the LIDAR device outputs a pre-defined light beam, for example a continuously emitted light beam. Hence, the camera is enabled to determine the spot size correctly. The factory mode may be used to set up the light detection module correctly, for example the camera of the light detection module.

Depending on the collimation of the light beam determined, the optical element of the light impinging determination module may be controlled appropriately in order to focus the impinging light on the detector (array) and/or angle of arrival sensor in a different manner in order to enable an accurate measurement.

Furthermore, a LIDAR testing system is provided that comprises a LIDAR device to be tested and a LIDAR target simulator as described above. The LIDAR device faces the screen, wherein the LIDAR device has a light emitting unit and a light receiving unit. As described above, the LIDAR device emits a light beam by its emitting unit that impinges on the screen, for example its front side. The screen may be at least partially transparent such that the light impinging determination module may be assigned to a rear side of the screen when sensing the light that shows through the screen. The LIDAR target simulator, for example the control and/or analysis module, processes the information concerning the location of the light impinging on the screen accordingly while calculating a response and issuing a response signal that is received by the LIDAR device, namely its light receiving unit. The response signal simulates a reflected signal of a target/obstacle in the environment scanned by the LIDAR device according to the target scenario applied.

In general, the LIDAR device to be tested may have several light emitting units that work in parallel to scan different areas. The LIDAR target simulator may have several response areas. The several response areas may be associated with the several light emitting units such that the entire LIDAR device can be tested by the LIDAR target simulator appropriately since several response areas are provided.

Each response area may be assigned to a respective screen. Hence, the LIDAR target simulator may comprise several screens.

However, the several response areas may also be associated with the light receiving units of the LIDAR device directly.

Further, the LIDAR target simulator may comprise several light impinging determination sub-modules for receiving and processing the different light beams issued by the several light emitting units that work in parallel.

The several light impinging determination sub-modules may also be used to improve the detection accuracy, for instance by detecting the same light beam impinging on the screen. The respective information concerning the location of the impinging light which is gathered by the several light impinging determination sub-modules may be compared with each other such that the detection accuracy is improved.

Put differently, the LIDAR target simulator having several response areas comprises several screens, several light impinging determination sub-modules, several response generation sub-modules and at least one control and/or analysis module that is connected with the several light impinging determination sub-modules and the several response generation sub-modules.

In general, the LIDAR device scans a volume in its front by sending out a light pulse, for example a laser pulse, in a certain direction, namely the field of view (FOV). The light pulse impinges on the screen, for example its front side, at a certain location. Since the screen may be at least partially transparent, the point of impact, namely the location of the impinging light, can be sensed on the other side of the screen as well, namely the rear side. Alternatively, the point of impact, namely the location of the impinging light, is sensed on the side of the screen on which the light impinges, for instance the front side.

The light impinging determination module detects the point of impact, namely the location of the impinging light, that can be sensed on the screen. The light impinging determination module may be associated with the front side or the rear side of the screen.

The light impinging determination module may comprise an optical element, namely an optic, that focusses the light provided on a detector (array) and/or a sensor, for instance a position sensitive detector, a detector array and/or an angle of arrival sensor.

The light impinging determination module processes the respective (and optionally focused) signal corresponding to the location of the impinging light of the light beam on the screen to the control and/or analysis module. In some embodiments, the light impinging determination module forwards a respective information concerning the location determined to the control and/or analysis module, wherein the information is encompassed by a respective signal forwarded to the control and/or analysis module.

The signal provided by the light impinging determination module may be digitized by an analog to digital converter (ADC) that may forward the time of impact as well as the location of impact of the light on the screen. In addition, the form of the impinging light, namely the form of the respective signal or rather the form of the light pulse, may also be forwarded.

The control and/or analysis module processes the respective signal received from the light impinging determination module in order to determine a response depending on the target scenario applied.

Then, the control and/or analysis module triggers the response generation module, for example a laser (diode), after a certain time that depends on the respective target scenario applied, namely the distance of an obstacle or rather target simulated in the field of view of the LIDAR device. As mentioned above, the field of view can be derived from the location of the impinging light on the screen which has been determined previously.

The response generation module, for example its laser diode, transmits a light pulse, for instance a laser pulse, back to the LIDAR device, wherein the response signal is a diffuse one. The response signal may be diffused by a diffusor that is part of the response generation module. Alternatively, the return signal, namely the return light pulse is already diffuse. Thus, the return light pulse may also be transmitted by a diffuse light source.

The diffuse light pulse may illuminate the entire area on the rear side of the screen illuminated by the LIDAR device previously that is at least partially transparent such that the light receiving unit of the LIDAR device detects the light that corresponds to the return light pulse or rather response light pulse.

Alternatively, the side of the screen illuminated by the LIDAR device previously is illuminated such that the light receiving unit of the LIDAR device detects the light.

Moreover, another screen compared to the one illuminated by the LIDAR device previously is illuminated such that the light receiving unit of the LIDAR device detects the light while scanning the another screen.

Further, the LIDAR device, for example the light receiving unit of the LIDAR device, directly receives the diffuse light pulse. Accordingly, the response signal may be provided in a diffused manner wherein the response signal is forwarded to the LIDAR device itself directly. The LIDAR device has at least one light receiving unit that is configured to detect the response signal outputted In any case, the return or rather response light pulse can be detected irrespective of the field of view of the LIDAR device.

The LIDAR device receiving the return or rather response light pulse is enabled to determine the distance of the simulated target/obstacle due to the delay in time between transmission of the light and reception of the response signal such that a (single) point of a point cloud (encompassing several points) can be created accordingly.

Typically, the scanning LIDAR device scans the entire volume in front of the LIDAR device (in a pointwise manner) such that the respective procedure described above repeats several times until the LIDAR device has created the entire point cloud.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Further, it will be appreciated that embodiments of the present disclosure may employ any combination of features described herein.

Figure 1:
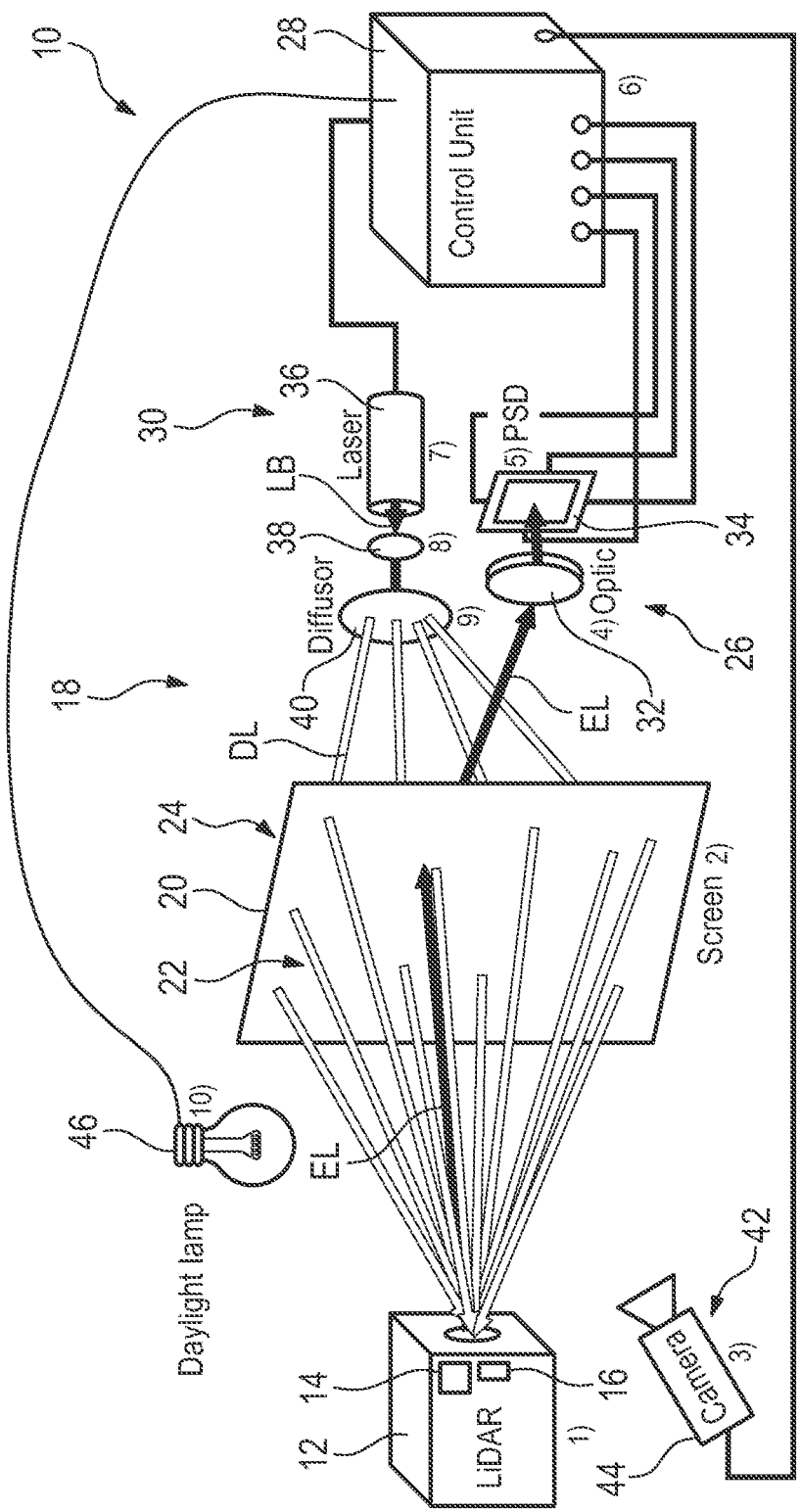
FIG. 1 schematically shows a LIDAR testing system according to an embodiment of the present disclosure which uses a LIDAR target simulator according to an embodiment of the present disclosure.

In FIG. 1, a LIDAR testing system 10 according to a first embodiment is shown that comprises a LIDAR device 12 that has a light emitting unit 14 as well as a light receiving unit 16. The light emitting unit 14 and the light receiving unit 16 are integrated within a housing of the LIDAR device 12.

The LIDAR testing system 10 also comprises a LIDAR target simulator 18 that interacts with the LIDAR device 12 in order to evaluate the LIDAR device 12 by simulating a respective target (scenario) for the LIDAR device 12 for evaluating purposes. The LIDAR target simulator 18 comprises a screen 20 that has a front side 22 as well as a rear side 24 that is opposite to the front side 22. The LIDAR target simulator 18 also comprises a light impinging determination module 26 that is connected with a control and/or analysis module 28 in a signal transmitting manner. The LIDAR target simulator 18 further has a response generation module 30 that is also connected with the control and/or analysis module 28 in a signal transmitting manner.

In general, the light impinging determination module 26 includes, inter alia, circuitry configured to determine the location of impinging light issued by the LIDAR device 12, which hits the screen 20, for example the front side 22 of the screen 20. The light impinging determination module 26 forwards information concerning the respective location to the control and/or analysis module 28 for further processing.

In the shown embodiment, the light impinging determination module 26 comprises an optical element 32, namely an optic, which faces the screen 20, for example the rear side 24 of the screen 20 in the shown embodiment. The optical element 32 is also associated with a position sensitive detector (PSD) 34 of the light impinging determination module 26.

Hence, the optical element 32 focuses the light available on the rear side 24 of the screen 20 that is at least partially transparent for the light used for testing the LIDAR device 12 such that the position sensitive detector 34 is enabled to determine the location of the impinging light on the screen 20 in an accurate manner. The position sensitive detector 34 forwards at least a respective signal to the control and/or analysis module 28 wherein the signal encompasses the information concerning the location of the impinging light on the screen 20.

The control and/or analysis module 28 includes one or more circuits for processing the information concerning the location accordingly, wherein a response for the LIDAR device 12 is determined based on a target scenario applied. In the respective target scenario, one or more obstacle(s) or rather target(s) in the environment of the LIDAR device 12 is/are provided that may reflect the signal emitted by the LIDAR device 12. Hence, corresponding reflected signals are simulated by the LIDAR target simulator 18 accordingly.

The control and/or analysis module 28 includes one or more circuits to determine a correct delay time for the response or brightness associated with the location of the impinging light determined by the light impinging determination module 26.

Depending on the response determined, circuitry of the control and/or analysis module 28 controls the response generation module 30. Thus, the control and/or analysis module 28 may trigger the response generation module 30 to generate a diffuse response signal that is transmitted towards the LIDAR device 12, for example the rear side 24 of the screen 20.

In the shown embodiment, the screen 20 is interposed between the LIDAR device 12 and the light impinging determination module 26. Furthermore, the screen 20 is interposed between the LIDAR device 12 and the response generation module 30.

In the shown embodiment, the response generation module 30 comprises a laser 36, an attenuator 38 as well as a diffusor 40 located downstream of the laser 36. The respective components of the response generation module 30 ensure that a diffuse response signal is outputted that illuminates an entire area on the rear side 24 of the screen 20.

The laser 36, the attenuator 38 and/or the diffusor 40 may be controlled by the control and/or analysis module 28 individually. For instance, the laser 36 may be controlled such that the response signal is modulated concerning its intensity in an appropriate manner depending on the respective target scenario applied. In a similar manner, the attenuator 38 may be controlled appropriately by the control and/or analysis module such that the response signal provided by the response generation module 30 is attenuated depending on the target scenario applied. The diffusor 40 may also be controlled such that the response signal is diffused in a controlled manner.

Generally, the response generation module 30 may also comprise a diffuse light source that is controlled by the control and/or analysis module 28 wherein the diffuse light source generates a response signal that is already diffuse.

The LIDAR target simulator 18 also comprises a light detection module 42 that is connected with the control and/or analysis module 28. In the shown embodiment, the light detection module 42 comprises, for example, a camera 44 that is connected with the control and/or analysis module 28 in a signal transmitting manner.

In the shown embodiment, the light detection module 42 is orientated towards the front side 22 of the screen 20 such that a spot size of a light beam hitting the front side 22 of the screen 20 can be measured, wherein the light beam was issued by the LIDAR device 12. Generally, the light detection module 42 is orientated towards the respective side of the screen 20 on which the light beam impinges. Thus, the light detection module 42 is enabled to determine the spot size of the light beam provided by the LIDAR device 12. In some embodiments, the collimation of the light beam on the screen 20 can be determined accordingly.

The respective information can be used by the control and/or evaluation module 28 in order to control the respective components of the LIDAR target simulator 18, for example the response generation module 30.

Further, the LIDAR target simulator 18 comprises an additional light source 46 that is also connected with the control and/or analysis module 28. The control and/or analysis module 28 can activate the additional light source 46 depending on the respective target scenario applied.

In general, the additional light source 46 disturbs the light sensed by the LIDAR device 12 that was transmitted by the response generation module 30. This is achieved by outputting the respective light into the direction of the LIDAR device 12 to be tested. Hence, the light receiving unit 16 of the LIDAR device 12 is disturbed, but the LIDAR target simulator 18 is not disturbed by the additional light. The additional light source 46 may be established by a daylight lamp that emits daylight. Accordingly, the LIDAR device 12 can be tested under real conditions since disturbances by the sunlight can be simulated accordingly.

In general, the LIDAR testing system 10 is used to test the LIDAR device 12 that is established by a scanning LIDAR device. Therefore, the light emitting unit 14 of the LIDAR device 12 emits a light beam ("emitted light"—EL) that may be a laser beam or rather a laser pulse. The emitted light EL hits the screen 20, for example the front side 22 of the screen 20, that is at least partially transparent in the shown embodiment.

The light detection module 42, for example the camera 44, that faces the front side 22 of the screen 20 is enabled to measure the spot size of the emitted light EL on the screen 20, wherein the respective information is forwarded to the control and/or analysis module 28.

In the shown embodiment, the emitted light EL is sensed by the light impinging determination module 26 facing the rear side 24 of the screen 20. The emitted light EL can be sensed on the rear side 24 since the screen 20 is at least partially transparent for the wavelength used for testing as mentioned above.

The light impinging determination module 26 comprises the optical element 32 that focuses the emitted light EL on the position sensitive detector 34 such that the location of the impinging light on the screen 20 can be determined accurately. The respective location, namely the information with regard to the location, is forwarded to the control and/or analysis module 28.

The control and/or analysis module 28 processes the information concerning the location appropriately such that a response for the LIDAR device 12 is determined based on the respective target scenario applied for testing purposes.

The control and/or analysis module 28 controls the response generation module 30, for example the laser 36, in order to emit a response signal to be received by the LIDAR device 12.

The response signal is a diffuse signal since the laser 36 outputs a (focused) laser beam LB that is generally similar to the emitted light EL of the LIDAR device 12, namely the laser beam or rather laser pulse. Therefore, the respective beams of the laser 36 and the light emitted by the LIDAR device 12 are illustrated in a similar manner in FIG. 1.

The laser beam LB emitted by the laser 36 is optionally attenuated by the attenuator 38 interposed between the laser 36 and the diffusor 40. The laser beam LB is diffused by the diffusor 40 in any case such that the diffuse response signal, namely the diffuse light DL, is obtained that illuminates the entire area of the screen 20, for example the rear side 24 of the screen 20.

This is also illustrated in FIG. 1 since the laser beam LB is diffused by the diffusor 40 such that several diffuse light beams DL are provided that illuminate the entire area of the screen 20, for example the rear side 24 of the screen 20.

Since the screen 20 is at least partially transparent, the diffuse light beams DL can be detected by the LIDAR device 12 facing the front side 22 of the screen 20, for example the receiving unit 16, irrespective of the field of view (FOV) of the LIDAR device 12 since the entire area of the screen 20 is illuminated.

Accordingly, the hardware costs for the entire LIDAR test system 10, for example the LIDAR test target simulator 18, can be reduced significantly, since it is not necessary to provide several different transmitters for illuminating a dedicated pixel on the screen 20.

Furthermore, it is not necessary to align the LIDAR device 12 with respect to the LIDAR target simulator 18 with regard to its receiving characteristics previously since the LIDAR target simulator 18 provides the diffuse response signal, thereby reducing the overall testing time required.

Accordingly, a cost-efficient way is provided to verify a LIDAR device 12 in an accurate manner.

Figure 2:
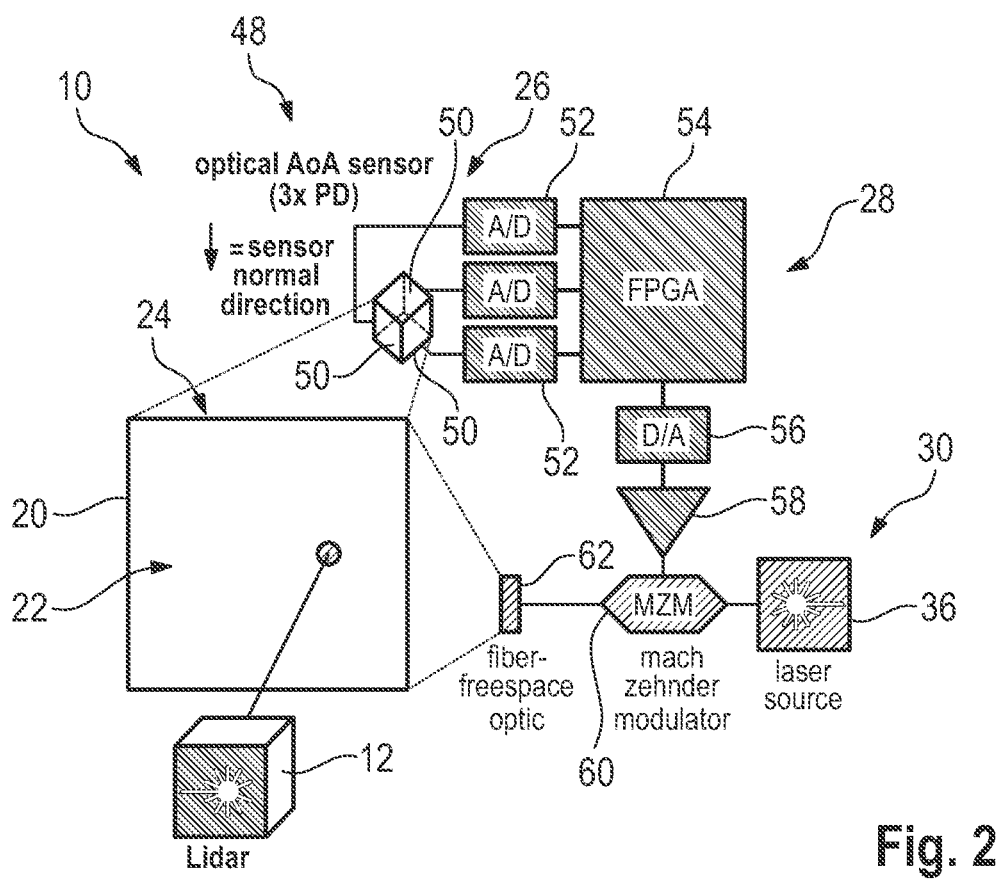
FIG. 2 schematically shows another embodiment of a LIDAR testing system according to the present disclosure with a LIDAR target simulator according to an embodiment of the present disclosure.

In FIG. 2, an alternative embodiment is shown in which the light impinging determination module 26 comprises an optical angle of arrival (AoA) sensor 48 having three orthogonal sensors 50. The sensors 50 are connected with analog to digital converters (ADCs) 52 that digitize the analog signals received from the optical sensors 50 for further processing by the control and/or analysis module 28.

The control and/or analysis module 28 in some embodiments includes a Field Programmable Gate Array (FPGA) 54 for calculating the response based on the signals received. Generally, the control and/or analysis module 28 may have any kind of digital signal processing unit. Further, the control and/or analysis module 28 may include a digital to analog converter (DAC) 56 as well as an amplifier 58.

The response generation module 30 comprises the laser 36 as well as a modulator 60, for example a Mach-Zehnder modulator, for modulating the intensity of the laser beam provided by the laser 36 based on the control signal received from the control and/or analysis module 28. Moreover, the response generation module 30 comprises an optic 62 for diffusing the response signal provided by the laser 36, for example the modulated response signal, such that the diffuse response signal is provided.

Figure 3:
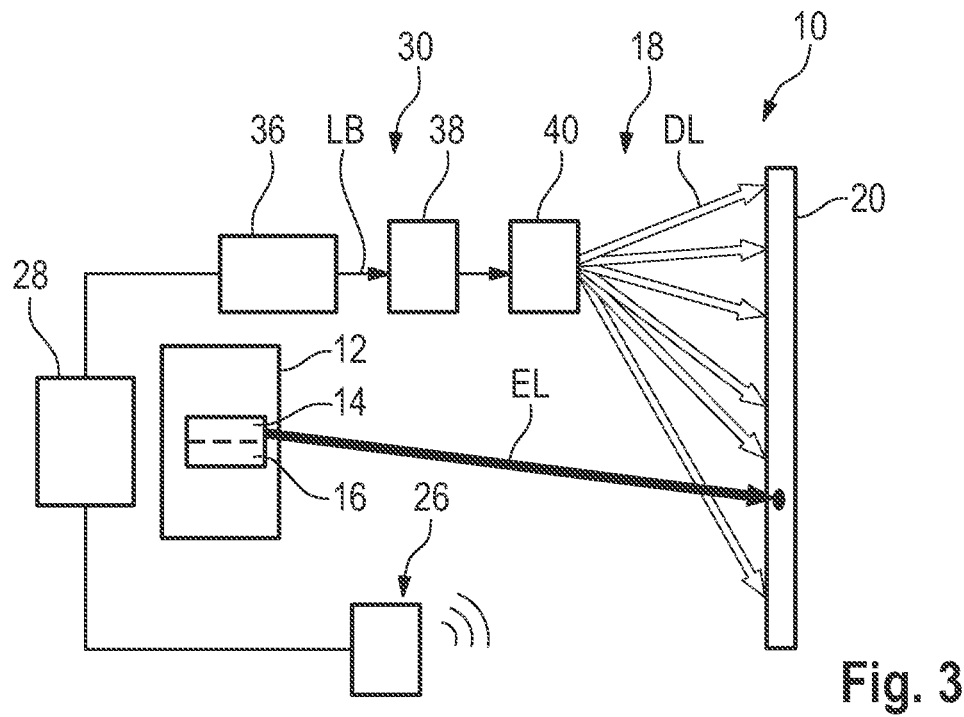
FIG. 3 schematically shows a further embodiment of a LIDAR testing system with a LIDAR target simulator according to an embodiment of the present disclosure.

In FIG. 3, a further embodiment of the LIDAR testing system 10 is provided that substantially distinguishes from the embodiment shown in FIG. 1 in that the LIDAR device 12 and the LIDAR target simulator 18, namely its light impinging determination module 26 as well as the response generation module 30, face the same side of the screen 20, for instance the front side or rather the rear side.

The light impinging determination module 26 scans the side of the screen 20 on which the light issued by the LIDAR device 12 impinges as indicated in FIG. 3. The information concerning the location determined is forwarded to the control and/or analysis module 28.

The control and/or analysis module 28 processes the information concerning the location determined by the light impinging determination module 26 in a similar manner as discussed above, namely determining a respective response based on a target scenario applied.

Then, the control and/or analysis module 28 controls the response generation module 30 in accordance with the response determined, wherein the response generation module 30 generates a diffuse response signal to be received by the LIDAR device 12, for example the light receiving unit 16.

The diffuse response signal generated by the response generation module 30 is directed towards the screen 20 such that the diffuse response signal illuminates the entire area on the same side of the screen 20 on which the signal emitted by the LIDAR device 12 impinged previously. This is also illustrated in FIG. 3. Accordingly, the LIDAR testing system 10 according to FIG. 3 only differs in the orientation of the respective components of the LIDAR target simulator 18 with respect to the screen 20.

Concerning all other features and characteristics, reference is made to the description of the embodiment according to FIG. 1 that also applies to the embodiment of FIG. 3.

Figure 4:
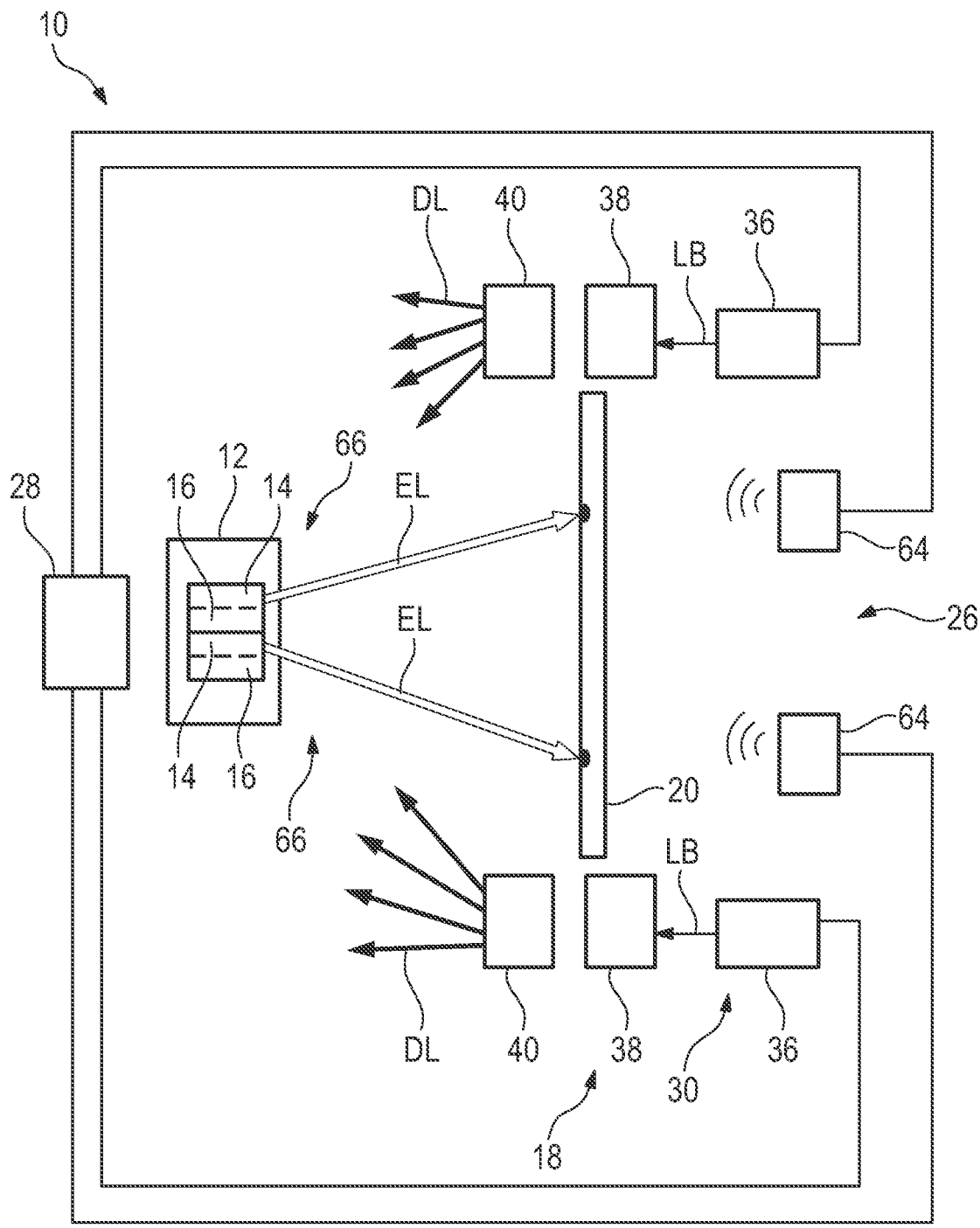
FIG. 4 schematically shows another embodiment of a LIDAR testing system according to the present disclosure with a LIDAR target simulator according to an embodiment of the present disclosure.

In FIG. 4, another embodiment of the LIDAR testing system 10 is shown in which the LIDAR device 12 has several light emitting units 14 and several light receiving units 16. The light emitting units 14 work in parallel to scan different areas as shown in FIG. 4.

The LIDAR target simulator 18 comprises several light impinging determination sub-modules 64 for receiving and processing the different light beams issued by the several light emitting units 14 that work in parallel. The several light impinging determination sub-modules 64 together establish the light impinging determination module 26 that scans the screen 20 in order to detect the different light beams impinging on the screen 20.

The LIDAR target simulator 18, for example the response generation module 30, is configured to transmit at least two different diffuse response signals to different response areas 66. For this purpose, several lasers 36, several attenuators 38 as well as several diffusors 40 are provided.

In the shown embodiment, the different response areas 66 are associated with the light receiving units 16 of the LIDAR device 12 that directly receive the diffuse response signals.

Accordingly, the embodiment of FIG. 4 differs from the previously shown ones in that the diffuse response signals are directly forwarded to the light receiving units 16 of the LIDAR device 12. However, the response signals are diffuse, thereby ensuring that the LIDAR device 12, namely its light receiving units 16, receive the response signals in any case. For a LIDAR device 12 with sensors, namely light receiving units 16, that receive light from only the direction the LIDAR device 12 is transmitting, it is preferred to provide a response to the screen 20 as it provides a response from the direction the LIDAR device 12 broadcasts the light that impinges on the screen. However, the LIDAR device 12 may have other sensors, light receiving units 16, that can be used to receive light from different directions.

In some embodiments, each response area 66 is associated with one corresponding of the several light emitting units 14.

Accordingly, the LIDAR testing system 10 according to FIG. 4 differs from the previously discussed embodiments in that several light emitting units 14, several light receiving units 16, the several light impinging determination sub-modules 64 as well as the response areas 66 are provided. The several response areas 66 come together with several lasers 36, several optional attenuators 38 and several diffusors 40. These aspects however correspond to testing a LIDAR device 12 scanning different areas simultaneously since the LIDAR target simulator 18 provides diffuse response signals for each area scanned by the LIDAR device 12.

Moreover, the LIDAR testing system 10 according to FIG. 4 differs from the previously discussed embodiments in that the diffuse response signals are directly forwarded to the LIDAR device 12, for example its light receiving units 16.

Concerning all other features and characteristics, reference is made to the description of the embodiments mentioned above that also applies to the embodiment of FIG. 4.

Generally, the features of the different embodiments can be interchanged. For instance, it is also possible to test a LIDAR device 12 with several light emitting units 14 and several light receiving units 16 while adapting the LIDAR target simulator 18 shown in any of FIGS. 1 to 3 accordingly.

Furthermore, the response determined by the control and/or analysis module 28 may over time based on the target scenario applied. Alternatively or additionally, the response generation module 30 generates at least one diffuse response signal that varies over time based on the target scenario applied. The control and/or analysis module 28 may control the response generation module 30 accordingly.

In general, the time-varying ensures that the diffuse response signal provided may vary in time, thereby providing a complex scenario for testing the LIDAR device appropriately.

In the embodiments discussed above, the LIDAR target simulator 18 determines the location of impinging light on the screen 20, wherein response based on a target scenario applied is determined while taking the information concerning the location of the impinging light on the screen 20 into account. Then, at least one diffuse response signal to be received by the LIDAR device 12 is generated which ensures that the LIDAR device 12, for example the at least one light receiving unit 16, receives the diffuse response signal irrespective of the field of view of the LIDAR device 12.

Certain embodiments disclosed herein include components, such as the light impinging determination module 26, the control and/or analysis module 28, the response generation module 30, the light detection module 42, etc., include, inter alia, circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A LIDAR target simulator for testing a LIDAR device, comprising:
    a screen;
    a light impinging determination module;
    a control and/or analysis circuit that is connected with the light impinging determination module in a signal transmitting manner; and
    a response generation module that is connected with the control and/or analysis circuit in a signal transmitting manner,
    wherein the light impinging determination module includes a sensor and circuitry configured to determine the location of impinging light on the screen, which relates to a field of view of the LIDAR device, and to forward information concerning the location determined to the control and/or analysis circuit;
    wherein the control and/or analysis circuit is configured to process the information concerning the location determined by the light impinging determination module and to determine a response based on a target scenario applied, wherein the control and/or analysis circuit is further configured to control the response generation module in accordance with the response determined; and
    wherein the response generation module is configured to generate a diffuse response signal to be received by the LIDAR device so as to obviate the need to provide several different transmitters that are controlled individually for providing the response signal.

2. The LIDAR target simulator according to claim 1, wherein the response generation module comprises at least one of a laser, a diffusor located downstream of the laser, and an attenuator for attenuating the response signal, which is located between the diffusor and the laser.

3. The LIDAR target simulator according to claim 1, wherein the control and/or analysis circuit is configured to determine a correct delay time for the response or brightness associated with the location of the impinging light determined by the light impinging determination module.

4. The LIDAR target simulator according to claim 1, wherein the sensor of the light impinging determination module comprises at least one position sensitive detector, at least one detector array and/or at least one angle of arrival sensor.

5. The LIDAR target simulator according to claim 1, wherein the control and/or analysis circuit is configured to determine a response that varies over time based on the target scenario applied.

6. The LIDAR target simulator according to claim 1, wherein the response generation module is configured to generate a diffuse response signal that varies over time based on the target scenario applied.

7. The LIDAR target simulator according to claim 1, wherein the light impinging determination module comprises an optical element assigned to the screen.

8. The LIDAR target simulator according to claim 1, wherein the response generation module is configured to generate more than one response signal to be received by the LIDAR device.

9. The LIDAR target simulator according to claim 1, wherein the response generation module comprises more than one laser and/or more than one diffusor.

10. The LIDAR target simulator according to claim 1, wherein the response generation module is configured to transmit at least two different diffuse response signals to different response areas, the different diffuse response signals are to be received by different light receiving units of the LIDAR device.

11. The LIDAR target simulator according to claim 1, wherein an additional light source is provided that is connected with the control and/or analysis circuit, and wherein the control and/or analysis circuit is configured to control the additional light source.

12. The LIDAR target simulator according to claim 11, wherein the additional light source is a daylight lamp that is configured to emit daylight.

13. The LIDAR target simulator according to claim 1, wherein a light detection module is provided that is orientated towards the screen, and wherein the light detection module includes circuitry configured to measure the spot size of a light beam on the screen.

14. The LIDAR target simulator according to claim 13, wherein the light detection module is configured to determine the collimation of the light beam.

15. The LIDAR target simulator according to claim 13, wherein the light detection module comprises a camera that is connected with the control and/or analysis circuit in a signal transmitting manner, and wherein the camera is configured to detect the spot of the light beam on the screen.

16. A LIDAR testing system comprising:
a LIDAR device to be tested and a LIDAR target simulator, wherein the LIDAR target simulator comprises:
a screen;
a light impinging determination module;
a control and/or analysis circuit that is connected with the light impinging determination module in a signal transmitting manner; and
a response generation module that is connected with the control and/or analysis circuit in a signal transmitting manner,
wherein the light impinging determination module includes a sensor and circuitry configured to determine the location of impinging light on the screen, defining a field of view of the LIDAR device, and to forward information concerning the location determined to the control and/or analysis circuit;
wherein the control and/or analysis circuit is configured to process the information concerning the location determined by the light impinging determination module and to determine a response based on a target scenario applied, wherein the control and/or analysis circuit is further configured to control the response generation module in accordance with the determined response;
wherein the response generation module is configured to generate a diffuse response signal to be received by the LIDAR device; and
wherein the LIDAR device faces the screen, and wherein the LIDAR device has a light emitting unit and a light receiving unit, thereby ensuring that the LIDAR device receives the response signal provided by the response generation module irrespective of the field of view of the LIDAR device.

17. The LIDAR testing system according to claim 16, wherein the LIDAR device to be tested has several light emitting units that work in parallel to scan different areas, and wherein the LIDAR target simulator has several response areas.

18. A method of testing a LIDAR device by a LIDAR target simulator, the method comprising:
determining a location of impinging light from the LIDAR device on a screen by a light impinging determination module of the LIDAR target simulator, wherein the location of the impinging light on the screen relates to a field of view of the LIDAR device;
forwarding information concerning the location to a control and/or analysis circuit of the LIDAR target simulator;
processing the information concerning the location of the impinging light on the screen by the control and/or analysis circuit;
determining a response based on a target scenario applied by the control and/or analysis circuit;
controlling a response generation module of the LIDAR target simulator in accordance with the response determined by the control and/or analysis circuit; and
generating a diffuse response signal by the response generation module, thereby ensuring that the LIDAR device receives the response signal provided by the response generation module irrespective of the field of view of the LIDAR device.

* * * * *